United States Patent
Alvarez Dominguez et al.

(10) Patent No.: US 11,917,713 B2
(45) Date of Patent: Feb. 27, 2024

(54) METHODS AND APPARATUSES FOR ACCESSING A SERVICE OUTSIDE A MOBILE COMMUNICATIONS NETWORK IN A MULTIPATH CONNECTION

(71) Applicant: Telefonaktiebolaget LM Ericsson (publ), Stockholm (SE)

(72) Inventors: Rodrigo Alvarez Dominguez, Madrid (ES); Marc Molla, Madrid (ES); Miguel Angel Muñoz De La Torre Alonso, Madrid (ES); Alfonso de Jesus Perez Martinez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 109 days.

(21) Appl. No.: 17/042,729

(22) PCT Filed: Sep. 10, 2018

(86) PCT No.: PCT/EP2018/074346
§ 371 (c)(1),
(2) Date: Sep. 28, 2020

(87) PCT Pub. No.: WO2019/185179
PCT Pub. Date: Oct. 3, 2019

(65) Prior Publication Data
US 2021/0022204 A1   Jan. 21, 2021

(30) Foreign Application Priority Data
Mar. 28, 2018  (EP) .................................... 18382214

(51) Int. Cl.
*H04W 76/34* (2018.01)
*H04W 76/15* (2018.01)
(Continued)

(52) U.S. Cl.
CPC ........... *H04W 76/34* (2018.02); *H04L 67/141* (2013.01); *H04W 8/02* (2013.01);
(Continued)

(58) Field of Classification Search
CPC ... H04W 76/34; H04W 8/02; H04W 28/0252; H04W 76/15; H04W 84/042; H04W 88/06; H04W 88/14; H04W 92/24; H04L 67/141
See application file for complete search history.

(56) References Cited

U.S. PATENT DOCUMENTS

2017/0223479 A1* 8/2017 Ly ........................ H04L 67/125
2018/0013782 A1* 1/2018 Choyi ................... H04L 63/108
(Continued)

FOREIGN PATENT DOCUMENTS

WO      2010111944 A1    10/2010

OTHER PUBLICATIONS

International Search Report and the Written Opinion of the International Searching Authority, issued in corresponding International Application No. PCT/EP2018/074346, dated Jan. 3, 2019, 16 pages.
3GPP, 3rd Generation Partnership Project; Technical Specification Group Radio Access Network; Evolved Universal Terrestrial Radio Access (E-UTRA) and NR; Multi-connectivity; Stage 2 (Release 15), 3GPP TS 37.340 V15.0.0, Dec. 2017, 52 pages.
(Continued)

*Primary Examiner* — Mazda Sabouri
(74) *Attorney, Agent, or Firm* — Rothwell, Figg, Ernst & Manbeck, P.C.

(57) ABSTRACT

The use of multipath enabled mobile entities accessing a service outside the network in a multipath connection. The invention relates to a method for operating an application server (100) providing a service to a multipath enabled mobile entity (10) connected to the application server with a first bearer of a first access network of a first mobile communications network, wherein the application server is external to the mobile communications network, whereas the method comprises the steps of receiving an indication
(Continued)

that the mobile entity (10) has an option to use another bearer not belonging to the first mobile communications network for accessing the application server, and of transmitting a request message towards a policy control entity (50) of the first mobile communications network requesting the policy control entity to disconnect the first bearer.

11 Claims, 6 Drawing Sheets

(51) Int. Cl.
*H04L 67/141* (2022.01)
*H04W 8/02* (2009.01)
*H04W 28/02* (2009.01)
*H04W 84/04* (2009.01)
*H04W 88/06* (2009.01)

(52) U.S. Cl.
CPC ....... *H04W 28/0252* (2013.01); *H04W 76/15* (2018.02); *H04W 84/042* (2013.01); *H04W 88/06* (2013.01)

(56) References Cited

U.S. PATENT DOCUMENTS

| | | | |
|---|---|---|---|
| 2018/0176710 A1* | 6/2018 | Jang | H04W 88/10 |
| 2018/0183882 A1* | 6/2018 | Flynn | H04L 69/321 |
| 2018/0192234 A1* | 7/2018 | Mohamed | H04L 67/12 |
| 2019/0166041 A1* | 5/2019 | Vasudevan | H04L 69/14 |
| 2019/0363974 A1* | 11/2019 | Wang | H04L 45/24 |

OTHER PUBLICATIONS

3GPP, 3rd Generation Partnership Project; Technical Specification Group Services and System Aspects; Policy and Charging Control Framework for the 5G System; Stage 2 (Release 15), 3GPP TS 23.503 V15.1.0, Mar. 2018, 66 pages.

3GPP, 3rd Generation Partnership Project; Technical Specification Group Services and System Aspects; System Architecture for the 5G System; Stage 2 (Release 15), 3GPP TS 23.501 V15.0.0, Dec. 2017, 182 pages.

Broadband Forum Technical Report "TR-348 Hybrid Access Broadband Network Architecture" Issue: 1, Issue Date: Jul. 2016, 49 pages.

* cited by examiner

METHODS AND APPARATUSES FOR ACCESSING A SERVICE OUTSIDE A MOBILE COMMUNICATIONS NETWORK IN A MULTIPATH CONNECTION

CROSS REFERENCE TO RELATED APPLICATION(S)

This application is a 35 U.S.C. § 371 National Phase Entry Application from PCT/EP2018/074346, filed Sep. 10, 2018, designating the United States, and also claims the benefit of European Application No. 18382214.7, filed Mar. 28, 2018, the disclosures of which are incorporated herein by reference in their entirety.

TECHNICAL FIELD

The application relates to a method for operating an application server providing a service to a multipath enabled mobile entity and to the application server providing the service. Furthermore, a method for operating a session management entity in a first mobile communications network is provided together with the corresponding session management entity. Furthermore, a system comprising the application server and the session management entity is provided and a computer program comprising program code. In addition, a carrier comprising the computer program is provided.

BACKGROUND

Hybrid Access technology is the way network operators offer the combined usage of fixed broadband and 3GPP access networks. In *TR-348 Hybrid Access Broadband Network Architecture* the architectural requirements are specified to allow coordinated and, when needed, simultaneous use of fixed broadband access and 3GPP access networks for converged operators, enabling further Fixed-Mobile Convergence (FMC) use cases.

In 5G standards the reference architecture of 5G is defined in 4.2.3 of 3GPP TS 23.501 V0.5.0 (2017-05). It defines the influence in traffic routing from an Application Function. This feature is not considering multipath scenarios and it is more focused in MEC (Mobile Edge Computing) scenarios.

In Rel14 29.251 an element called PFDF (Packet Flow Description Function) is introduced. The PFDF is a functional element which stores PFDs associated with application identifier(s) and transfers them to the PCEF (Policy and Charging Enforcement Function) via Gw interface to enable the PCEF to perform accurate application detection when the PFDs are managed by a 3rd party service provider.

In Rel15 29.122 the T8 interface is defined. The T8 reference point is between the SCS/AS (Service Capability Server/Application Server) and the SCEF (Service Capability Exposure Function). It specifies RESTful APIs (Application Programming Interface) that allow an SCS/AS to access the services and capabilities provided by 3GPP network entities and securely exposed by the SCEF (Service Capability Exposure Function). One of those API is monitoring event API (as described in sub clause 4.4.6.1 in 23.682) where SCS/AS can subscribe to some monitoring events like UE loss of connectivity, UE location reporting, UE roaming status, communication failure, change of IMEI-IMSI association. Other APIs like Network Parameter Configuration API allows the SCS/AS to send the suggested network parameters to influence certain aspects of UE/network behavior. In current standards, 29.122, SCS/AS can request a certain QoS (Quality of Service) treatment for a specific application during a time period or number of packets. It is not possible SCS/AS to subscribe and be notified when a specific event occurs in the OTT (over the top) domain, i.e. outside the operator controlled cellular network.

Rel15 3GPP TS 23.682 specifies the architecture enhancements to facilitate communications with packet data networks and applications Radio spectrum is a finite resource. Once a radio band is allocated nobody else can use it. Radio resources in the operator networks are scarce. Operators are always looking for an efficient management of the radio resources.

Currently there are some procedures to alleviate radio congestion or to reduce spurious signaling. These procedures consist of monitoring mobile signaling or user traffic in the mobile network and of freeing up resources when they are not needed anymore.

The future mobiles will allow multipathing, multiple connections via wireless (WiFi) and radio could be established. The operator will need new procedures to determine if user is using a public WiFi connection (e.g. airport) or private WiFi (e.g. from another operator). If operator could get this information, radio resources could be released or minimized, saving radio spectrum.

The main problem is that operators are not aware of other parallel WLAN or other non-cellular access options of the subscriber. The operators still have radio connections for those users that are using parallel WLAN access so radio resources are wasted.

SUMMARY

Accordingly, a need exists to effectively use the radio spectrum in the mobile communications networks in the scenarios mentioned above in which mobile entities may have another connection possibility to a service provided by an application server outside the mobile communications network.

This need is met by the features of the independent claims. Further aspects are described in the dependent claims.

According to a first aspect a method for operating an application server providing a service to a multipath enabled mobile entity is provided wherein the mobile entity is connected to an application server with a first bearer of a first access network of a first mobile communications network wherein the application server is external to the mobile communications network. The application server receives an indication that the mobile entity has an option to use another bearer not belonging to the mobile communications network for accessing the application server. The application server then transmits a request message towards a policy control entity of the first mobile communications network requesting the policy control entity to disconnect the first bearer (e.g. in response to the received indication).

Furthermore, the application server configured to provide the service to the multipath enabled mobile entity is provided wherein the mobile entity is connected to the application server with a first bearer of the first access network of the first mobile communications network with the application server being external to the mobile communications network. The application server comprises a memory and at least one processing unit, wherein the memory contains instructions executable by the at least one processing unit. The application server is operative to work as discussed above or as discussed in further detail below.

As an alternative an application server is provided configured to provide a service to the multipath enabled mobile entity connected to the application server with the first bearer of the first access network belonging to the first mobile communications network, wherein the application server is external to the mobile communications network. The application server comprises a first module configured to receive the indication that the mobile entity has an option to use another bearer not belonging to the first mobile communications network for accessing the application server. The application server comprises a second module configured to transmit a request message towards a policy control entity of the first mobile communications network requesting the policy control entity to disconnect the first bearer in response to the received indication.

With the above described features an application server provided outside the mobile communications network can inform the nodes of the mobile communications network that it is possible to free up resources as the multipath enabled mobile entities can use other bearers for accessing the service provided by the application server. Accordingly, an entity outside the mobile network can trigger the freeing of resources.

Furthermore, a method for operating a session management entity in a first mobile communications network is provided wherein the session management entity requests from a policy control entity of the first mobile communications network which multipath enabled mobile entities are connected to the application server, wherein the application server provides a service to the connected mobile entities via first bearers of a first access network of the first mobile communications network. Furthermore, it is requested which of the multipath enabled mobile entities use the multipath connection to the application server with the application server being external to the first mobile communications network. The session management entity receives a response from the policy control entity including a list of possible mobile entities that use a multipath connection to the application server. Furthermore, at least one mobile entity is selected from the list of possible mobile entities which should not access the application server via the corresponding first bearer. An indication is transmitted towards the at least one mobile entity indicating that the at least one mobile entity should stop using the corresponding first bearer for the connection to the application server.

Additionally, the session management entity provided in the first mobile communications network is provided which comprises a memory and at least one processing unit wherein the memory comprises instructions executable by the at least one processing unit. The session management entity is operative to work as discussed above or as discussed in further detail below.

As an alternative a session management entity provided in a first mobile communications network is provided which comprises a first module configured to request from a policy control entity of the first mobile communications network, which multipath enabled mobile entities are connected to the application server which provides the service to the connected mobile entities via a first bearer of the first access network of the first mobile communications network. The first module is further configured to request which of the multipath enabled mobile entities use the multipath connection to the application server with the application server being external to the first mobile communications network. The session management entity comprises a second module configured to receive a response from the policy control entity including the list of possible mobile entities that use the multipath connection to the application server. A third module is configured to select at least one mobile entity from the list of possible mobile entities which should not access the application server via the corresponding first bearer. A fourth module of the session management entity is configured to transmit an indication towards the at least one mobile entity which indicates that the at least one mobile entity should stop using the corresponding first bearer for the connection to the application server.

In this second aspect the session management entity takes advantage of the multipath technology to free resources in the mobile communications network.

Furthermore, a system comprising the application server and the session management entity as discussed above is provided.

Additionally a computer program comprising program code to be executed by at least one processing unit of an application server or of a session management entity is provided wherein execution of the program code causes the at least one processing unit of the application server or of the session management entity to execute a method as discussed above or as discussed in further detail below.

A carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the abovementioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
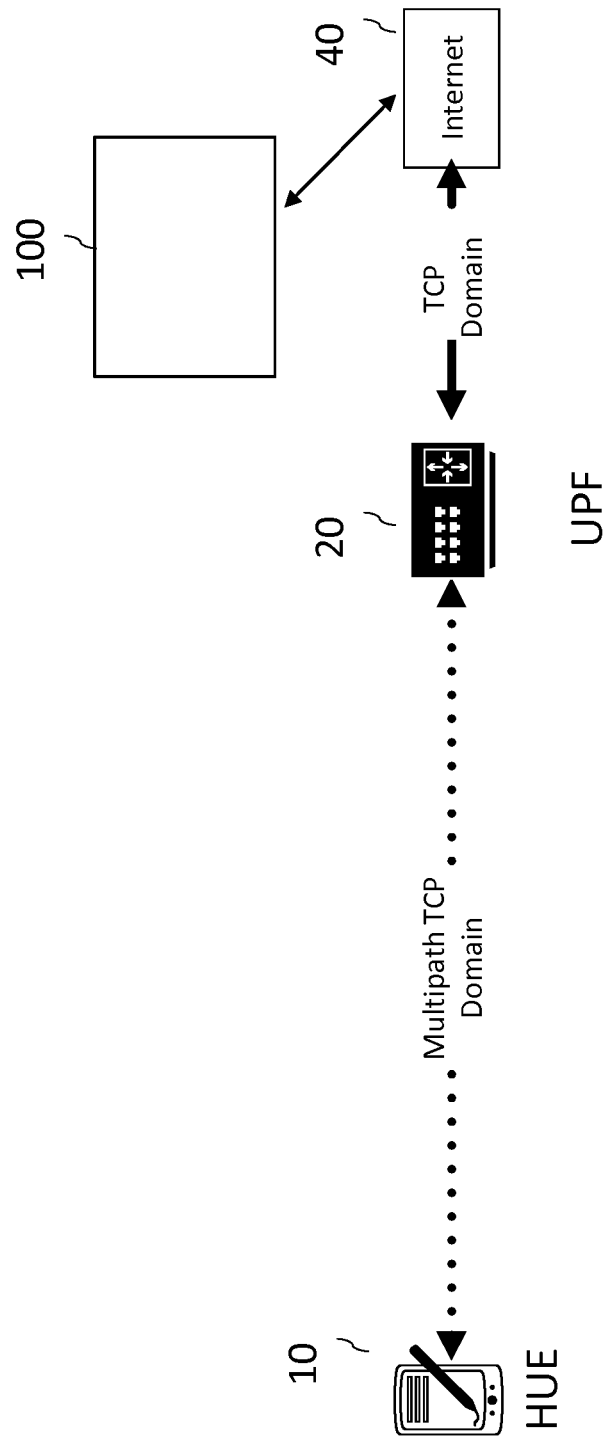
FIG. 1 shows a high level scenario in which a multipath enabled mobile entity is connected to an application server using a multipath connection.

In the following, embodiments of the application will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application the term "mobile entity" or user equipment (UE) refers to a device for instance used by a person/user for his/her or his/her personal communication. The mobile entity is a hybrid mobile entity (HUE) which is multipath enabled. It can be a telephone type of device, for example a telephone or a session initiating protocol, SIP, or Vol P phone, cellular telephone, a mobile station, cordless phone, or a personal digital assistant type of device like laptop, notebook, notepad, tablet equipped with a wireless data connection. The mobile entity may also be associated with non-humans like animals, plants or machines. A mobile entity may be equipped with a SIM (Subscriber Identity Module) comprising unique identities such as IMSI (International Mobile Subscriber Identity), TMSI (Temporary Mobile Subscriber Identity), or GUTI (Globally Unique Temporary UE Identity) associated with the user using the mobile entity. The presence of a SIM within the mobile entity customizes the mobile entity uniquely with a subscription of the user. It is noted that there is a difference but also tied connection between a user and a subscriber. The user gets access to a network by acquiring a subscription to the network and by that becoming a subscriber within the network. The network then recognizes the subscriber and uses the associated subscription to identify related subscription data. A user can be the actual user of the mobile entity and the user may also be the one owing the subscription, but the user and the owner of a subscription may also be different persons.

As described below an application server located outside a mobile communications network can influence the mobile communications network such that a bearer or path can be deleted in a faster way when the mobile entity is not using it. Furthermore, it is described how end-users can be off-loaded to a different network when it is needed to free resources in the mobile communications network.

In the following a scenario is described as shown in FIG. 1 in which a multipath enabled mobile entity (hybrid user entity, HUE) is connected to a mobile communications network in which there is also a node with deep packet inspection and a service classification functionality such as UPF 20 (User Plane Function) which is connected to the Internet 40 and to an application server 100 which is operated outside the mobile communications network. The application server 100 is a server providing a certain service, e.g. the streaming of video such as Netflix or any other server. Furthermore, an application server provider, ASP, e.g. using a web server is provided. The ASP server deployment may be inside or outside the mobile communications network and can be provided in the public Internet.

SCS/AS APP: Before generating traffic that will be classified by UPF, the client (mainly an app) wants to know if that traffic has dedicated rules (e.g. for zero-charging or special QoS) due to it belongs to an OTT with a ASP Server installed. It can receive information from the ASP. It is installed in the mobile entity. The SCS/AS can know optionally that it is using a WiFi connection.

UPF (20): Deep packet inspection and service classification requires updated rules from PFDF (Packet Flow Description Function) server to classify the traffic from UE properly and apply, for instance, desired QoS or charging. These rules are generated dynamically using the ASP information, which sends the information towards the PFDF. Moreover, UPF needs to enrich uplink packets with useful information for ASP server, using Content Enrichment feature with HTTP or HTTPs headers. UPF has also multipath capabilities that implements the network side mechanisms for simultaneous use of both fixed broadband and 3GPP access networks.

SCS/AS (100): it contains updated information directly from OTTs for classification, and receives enriched packets saving added information as well. It needs to send downlink packet with the updated information (e.g. into a HTTPs header) and additional headers with useful data for UE. It has the detection rules and Qos rules that should be provided towards the operator. It also communicates with ASP App. The SCS/AS can read the plmn-id (Public Land Mobile Network Identifier) when it is enriched in the UPF.

HUE (10): Hybrid User Equipment. UE enhanced to support the access side mechanisms for simultaneous use of both fixed broadband and 3GPP access—HUE has installed ASP App The solution discussed below provides a mechanism to the provider of the application server 100 to inform the operator of the mobile communications network that off-loading to another network such as a non-cellular access network, e.g. WiFi, is possible and that a path can be deleted based on instructions from the server outside the mobile network. In the embodiment discussed in connection with FIG. 2 a bearer between the multipath enabled mobile entity and the application server is deleted according to the instructions provided by the application server. In case of multipath users, for operators of a mobile communications network, it is in the art known not possible to know when the end user has logged into another network such as a public or private WiFi network and when that user is using these other networks for downloading the content provided on the application server. The use case discussed below in connection with FIG. 2 allows to provide a better usage of radio resources when an end user has a parallel connection via a mobile communications network such as LTE or 5G and another non-cellular access network such as WiFi or WiMAX.

The operator of the mobile radio access network is not aware of the other bearer connection via the non-cellular access network until the application server 100 informs the operator accordingly.

Figure 2:
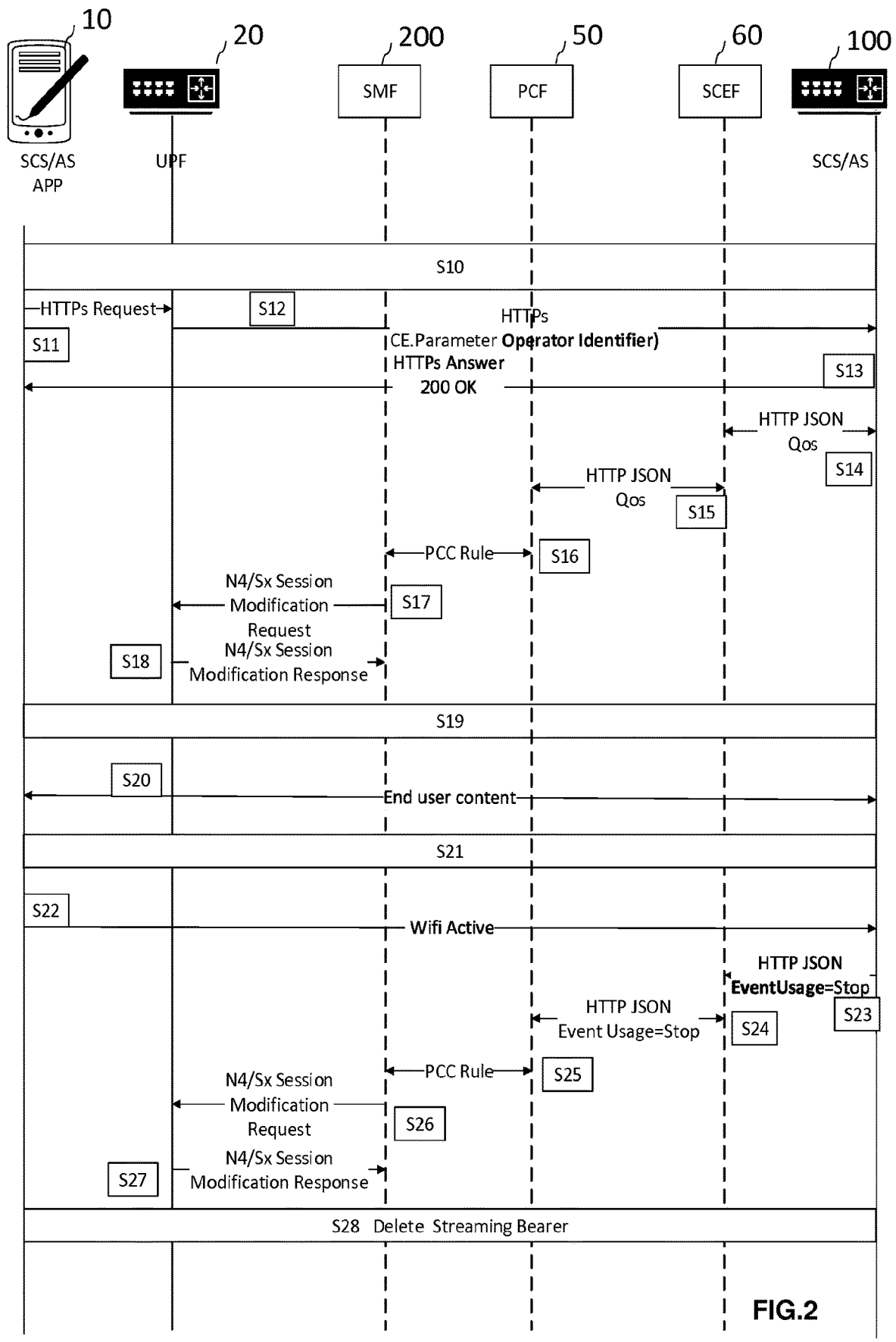
FIG. 2 shows an example message exchange between the involved entities when a bearer connection of a mobile communications network to an application server external to the network is cancelled.

In the following the different steps shown in FIG. 2 are discussed in more detail:

Step S10: SCS/AS 100 has provided the rules towards PFDF and PCF 50 through SCEF 60. End user has a connection established.

Step S11: When the user opens the target application, the SCS/AS App triggers the SCS/AS 100 signaling request message [HTTP GET over TLS (Transport Layer Security); the TCP and TLS handshake is not shown in the sequence diagram for simplicity purposes], SCS/AS App sends the traffic using the first path configured according to its policies, here the access network of the mobile network Step S12: Previously, UPF 20 has downloaded the PDR (Packet Detection Rule) rules needed for this user. UPF detects SCS/AS App signaling and performs Content Enrichment (with parameters like plmn(Public Land Mobile Network)-id (operator identifier), MSISDN). This Content Enrichment is applied for the first message with HTTP protocol encrypted with TLS (Transport Layer Security).

Step S13: SCS/AS 100 retrieves the enriched parameters (at this point SCS/AS knows the operator) and authorizes the request. SCS/AS triggers a response (HTTP 200 OK over TLS).

Step S14: SCS/AS 100 sends towards SCEF 60 that this user needs a specific Qos for the target application. It uses the AsSessionWithQoS API.

Step S15: From the information retrieved from SCS/AS 100 in Step S14 above, SCEF 60 sends the corresponding information towards the PCF 50.

Step S16: This information will be translated by PCF 50 into a PCC (Policy Charching Control) rule. PCF 50 requests a streaming bearer. It can be done using N7 reference point in 5G standards (3GPP TS 23.501)

Step S17: SMF (Session Management Function) 200 reads the PCC rule and translates it into a PDR rule. SMF 200 uses the N4/Sx Modification Request to send the PDR Rule towards the UPF. It includes that a streaming bearer should be created. It can be done using N4 reference point in 5G standards (3GPP TS 23.501)

Step S18: UPF 20 acknowledges the N4/Sx Modification Response.

Step S19: Streaming bearer is created for the encrypted content of the end user.

Step S20: End user downloads the content using the streaming bearer.

Step S21: End user (HUE 10) with the SCS/AS app gets into a zone with WiFi coverage for example, Step S22: SCS/AS app sends towards ASP the information regarding WiFi is active. UPF 20 of the operator which provided the Streaming bearer connection is not aware of the Wifi access. Those SCS/AS 100 that are aware of the WiFi connection can signal it towards the SCS/AS.

Step S23: SCS/AS 100 discovers that the end user is receiving traffic from another operator. It discovers using one of the following methods:

The SCS/AS app can signal that is using a WiFi connection

In case OTT receives a new connection without the enrichment of the plmn-id or with a different plmn-id SCS/AS sends to the SCEF of the first operator that the SCS/AS app has other access using the AsSessionWithQoS API. SCS/AS communicates towards SCEF using for example the following new field:
eventType with value OtherNetwork
and using the current field qosReference that refers to a Qos Policy that is Disconnect Step S24: From the information retrieved from SCS/AS 100 in Step S14 above, SCEF 60 sends the corresponding information towards the PCF 50.

Step S25: This information will be translated by PCF 50 into a PCC rule. PCF 50 requests a streaming bearer deletion. It sends this information using the N7 reference point (3GPP TS 23.501)

Step S26: SMF 200 reads the PCC rule and translates it into a PDR rule. SMF using the N4/Sx Modification Request sent the PDR Rule towards the UPF 20. It includes that a streaming bearer should be deleted Step S27: UPF 20 acknowledges the N4/Sx Modification Response Step S28: Streaming bearer is deleted.

In a second use case discussed in connection with FIG. 3 the following scenarios are described:

a user opens an application that needs to guarantee the traffic as for example a Skype call, signaling from an autonomous car or a bank transaction. A PDN gateway can make sure that this traffic is prioritized by activating a dedicated bearer with minimum bit rate. The radio access node can map this dedicated bearer to a radio bearer;

another possible example is when the mobile entity 10 cannot create the PDN connection because there are not enough resources.

For both cases, it is possible that this mapping fails for insufficient resources in the radio access node, such as eNodeB. In this case the PDN gateway may trigger a user path migration to a non-3GPP connection if the user is under a multipath environment. The mobile entity 10 migrates the traffic from one path to the second path, from the mobile network path to the non-cellular path such as WiFi taking advantage of the multipath technology that provides a smooth migration. The multipath technology intrinsically provides this smooth migration.

The method described below provides a procedure to offload some multipath users when the application server would need it.

Figure 3:
FIG. 3 shows an example message exchange between the involved entities when some of the mobile entities are requested to stop using a bearer of a mobile communications network.

In FIG. 3 the steps are shown for providing the needed quality of service for an end user who is in a zone where there are not enough radio resources. The application server can help operators indicating which users can be offloaded to the non-cellular access network such as WiFi. The procedure is similar to the case when an end-user is not able to connect initially via the radio access network of the mobile communications network.

Step S31: In one zone based on the same Radio Base Station (eNodeB) there are several users. Some of them have also Wi-Fi connection. Other users have multipath with Wifi and LTE.

Step S32: One of the users of LTE downloads a content (video for example that needs streaming bearer) in the same way as in FIG. 2. SCS/AS 100 sends towards SCEF 60 that this user needs a specific QoS for the target application. It uses the AsSessionWithQoS API. SCEF 60 receives this request and sends towards PCF 50 and AMF (Access and Mobility Management Function) 70 using the reference point defined by the standards ((3GPP TS 23.501).

Step S33: This request is received by AMF 70 but rejected due to insufficient resource. Then AMF 70 notifies towards SMF 200 the zone where this user session with the specified QoS cannot be created.

Step S34: SMF 200 asks to PCF 50 which users in same Radio Base Station are using multipath and which FAR (Forwarding Action Rule) should be applied. So, operator can handover those users that operator knows that they are using multipath.

Step S35: Optionally, this user list could also be sent towards SCS/AS 100. SCS/AS 100 can know if those users are using multipath with other operators (same as FIG. 2).

Step S36: Optionally, if step S35 is selected, SCS/AS 100 can filter these users (based on SCS/AS criteria for example to avoid migration of premium OTT users) or add new users as in FIG. 2. OTT will return the filtered list to PCF 50.

Step S37: PCF 50 sends the list of users that are in that Radio BS selected and use multipath.

Step S38: SMF 200 sends towards all those users that they must migrate to one path (not use LTE). It can be used for all the users of the list of steps S35 or only for those that have less priority. If there are not any users in the list, step S37 and S38 will not be performed.

Step S39: For those users selected in step S36, the LTE (bearer of the mobile communications network) path will be deleted.

Step S40: SMF 200 sends towards AMF 70 that there are free resources.

Step S41: AMF 70 checks if there are free resources now and creates the PDN Session with the right QoS Optionally, AMF 70 can inform the SCS/AS 100 about this decision.

Figure 4:
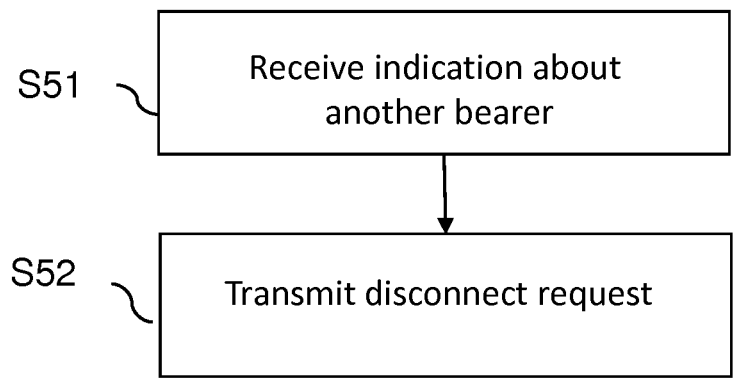
FIG. 4 shows an example flowchart of a method carried out by an application server in a scenario shown in FIG. 2.

FIG. 4 summarizes some of the steps carried out by the application server in the embodiment discussed above in connection with FIG. 2. In step S51 the application server 100 receives the indication that the mobile entity has the opportunity to use another bearer not belonging to the mobile communications network in order to access the application server. In step S52 the application server then transmits a request message towards the policy control entity of the mobile network in which the policy control entity is requested to disconnect the bearer.

Figure 5:
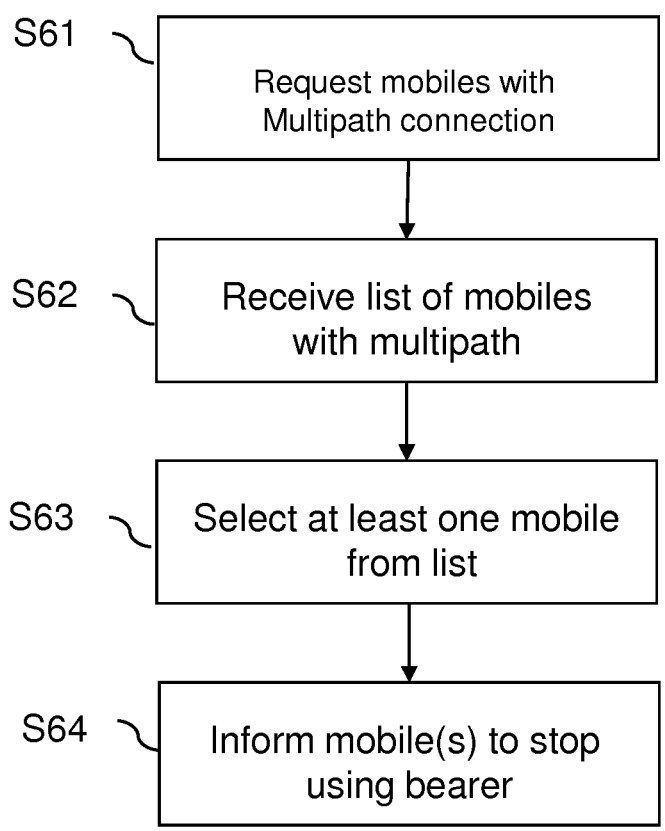
FIG. 5 shows an example flowchart of a method carried out by a session management entity in a scenario shown in FIG. 3.

FIG. 5 summarizes some of the steps carried out by the session management function 200 in the embodiment discussed in connection with FIG. 3.

In step S61 the session management entity requests information from the policy control entity, PCF of the mobile network which multipath enabled mobile entities are connected to the application server 100 and which of them use the multipath connection to the application server. In step S62 the session management entity receives the response from the policy control entity including the list of possible mobile entities that use the multipath connection to the application server. The session management entity can then select one or some or all entities of the list which should stop accessing the application server via the bearer of the mobile communications network (step S63). In step S64 an indication is transmitted to each of the mobile entities of the list which were selected in step S63 by which the mobile entities are informed that they should stop using the bearer of the mobile network.

Figure 6:
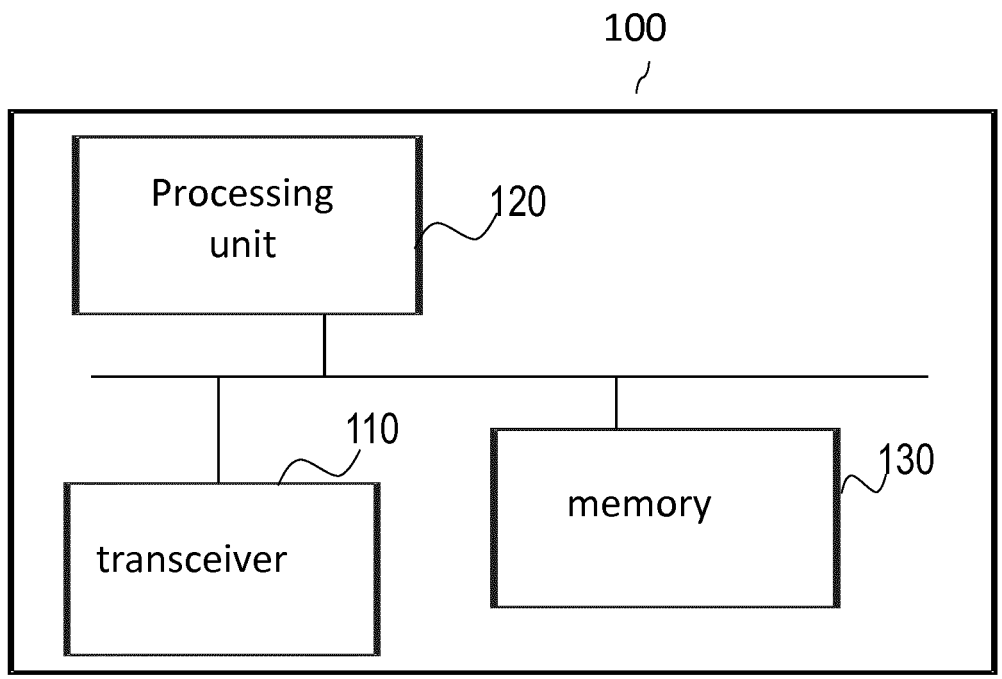
FIG. 6 shows an example schematic representation of an application server configured to inform a mobile communications network that the bearers of some mobile entities can be deleted due to other connection possibilities to the application server.

FIG. 6 shows a schematic architectural view of an application server which can carry out the above discussed steps of FIGS. 2 and 4. The application server comprises an transceiver 110 which is provided for transmitting user data or control messages to other entities an which is provided for receiving user data or control messages from other entities using a receiving functionality. The transceiver is especially configured to transmit the service data such as movies to the mobile entity and is configured to receive the indication about the mobile entity having another option for another bearer to access the server wherein the transceiver is furthermore configured to transmit the request message towards the policy control entity in step S23. The server 100 comprises a processing unit 120 which is responsible for the operation of the server 100. The processing unit 120 comprises one or more processors and can carry out instructions stored on a memory 130, wherein the memory may include a read-only memory, a random access memory, a mass storage, a hard disk, or the like. The memory can furthermore include suitable program code to be executed by the processing unit 120 so as to implement the above described functionalities in which the server 100 is involved.

Figure 7:
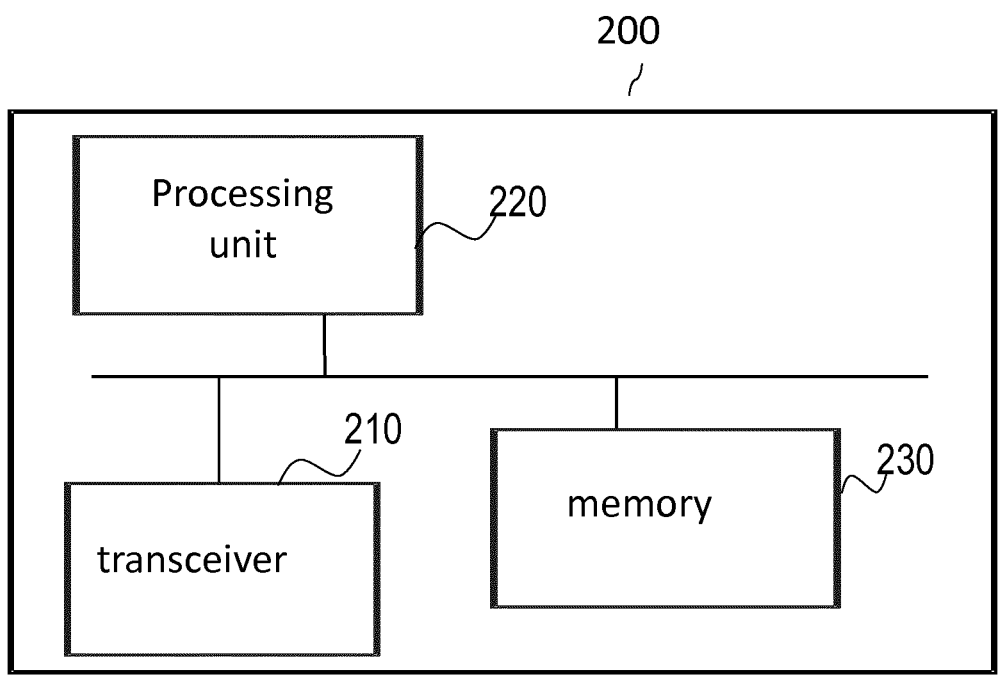
FIG. 7 shows an example schematic representation of a session management entity operating in a scenario as discussed in connection with FIG. 3.

FIG. 7 shows a schematic architectural view of the session management entity 200 which can carry out the above discussed steps of FIGS. 3 and 5. The entity 200 comprises a transceiver 210 used for transmitting user data or control messages to other entities and used for receiving user data or control messages from other entities. The transceiver 210 is especially configured to request the list from the policy control entity about the multipath mobile entities and to transmit the indication towards the selected mobile entities which should stop using the first bearer of the mobile communications network. The entity 200 furthermore comprises a processing unit 220 which is responsible for the operation of the entity 200. The processing unit 220 comprises one or more processors and can carry out instructions stored on a memory 230, wherein the memory may include a read-only memory, a random access memory, a mass storage, a hard disk, or the like. The memory 230 can furthermore include suitable program code to be executed by the processing unit 220 so as to implement the above described functionalities in which a session management entity is involved.

Figure 8:
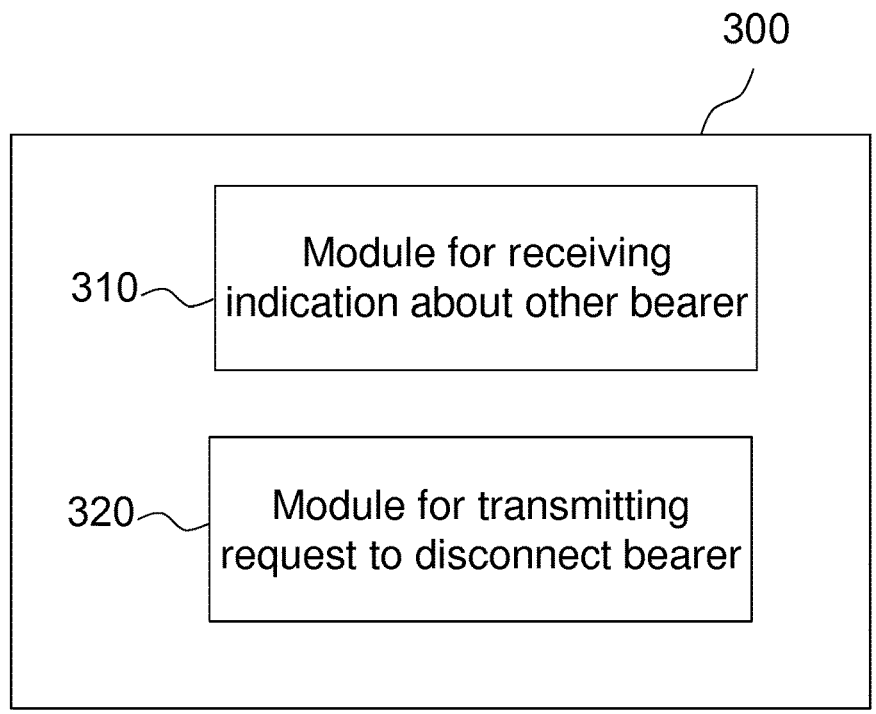
FIG. 8 shows another example schematic representation of an application server operating in a scenario shown in FIG. 2.

FIG. 8 shows an alternative embodiment of an application server 300 which comprises a first module 310 configured to receive the indication that the mobile entity has an option to use another bearer not belonging to the mobile communications network which can be used to access the application server 100. The application server 300 furthermore comprises a second module 320 configured to transmit a request message towards the policy control entity requesting the policy control entity to disconnect the first bearer of the mobile communications network.

Figure 9:
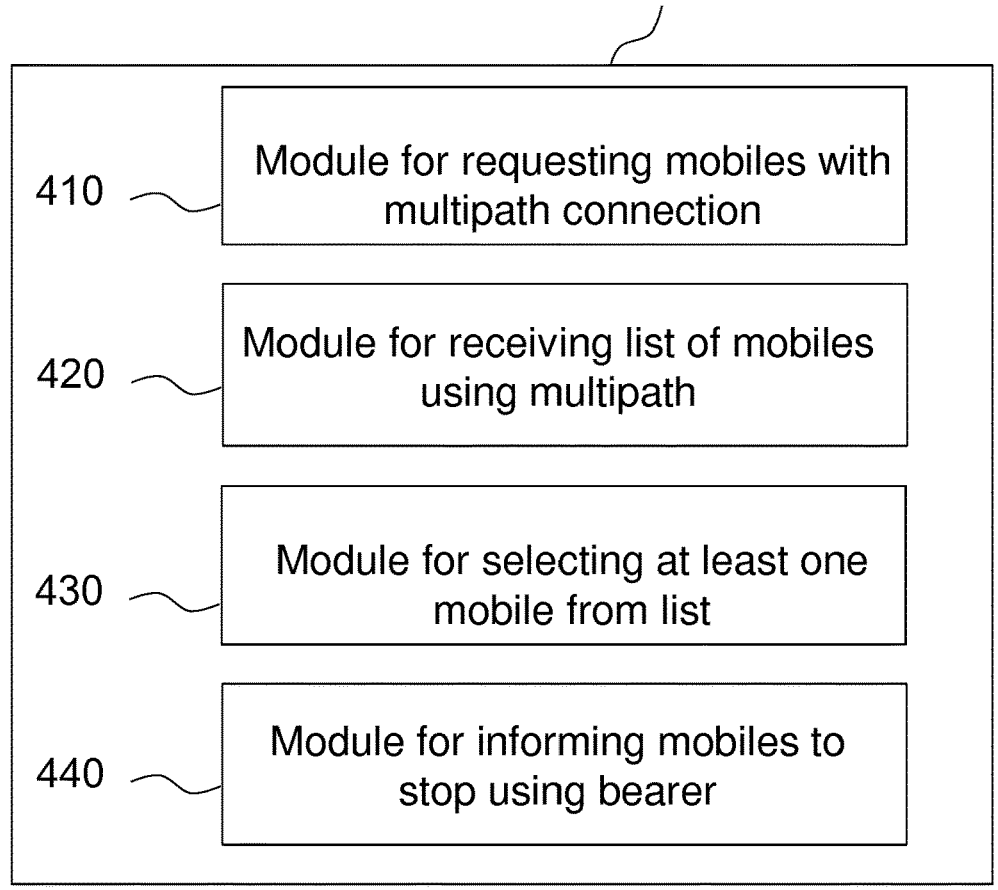
FIG. 9 shows another example schematic representation of a session management entity configured to operate in a scenario shown in FIG. 3.

FIG. 9 discloses another configuration of a session management entity working as discussed above in connection with FIGS. 3 and 5. The session management entity 400 comprises a first module 410 configured to request which multipath enabled mobile entities are connected to the application server and which of the multipath enabled mobile entities use the multipath connection. The session management entity comprises a second module configured to receive the list of possible mobile entities which use the multipath connection to the application server 100/300. A third module 430 is provided configured to select at least one mobile entity from the list of possible mobile entities which should not access the application server with a bearer of the mobile communications network. A fourth module 440 then transmits an indication towards the at least one mobile entity selected from the list and which indicates that the corresponding mobile entity should stop using the bearer of the mobile communications network.

From the above scenarios some further general conclusions can be drawn.

As far as the application server is concerned the request message in which it is requested to disconnect the bearer of the mobile communications network is transmitted to an entity configured to expose the capabilities of the interfaces provided in the first mobile communications network, in the example shown in FIG. 2 the SCEF 60. When the indication is received by which the server is informed about the option of the other bearer, the information is received from the mobile entity that the mobile entity can access the service provided by the application server using the other bearer in a non-cellular access network, such as WiFi.

The request message transmitted towards the policy control entity can comprise a quality of service parameter indicating to disconnect the first bearer.

As far as the session management entity 200 discussed in connection with FIGS. 3 and 5 is concerned, the session management entity requests from the policy control entity which mobile entities are connected to the server 100 in a multipath connection. This step can comprise the step which mobile entity connected to the same radio access network uses the multipath connection to the application server.

When an indication is transmitted towards the mobile entity the indication may be transmitted towards a user plane management entity such as AMF 70 of the mobile communications network.

When the indication is transmitted towards the at least one mobile entity 10 a request can be transmitted to delete the corresponding first bearer used by the mobile entity to access the application server.

Furthermore, the session management entity 200 can inform the mobility management entity of the first mobile communications network that free bearer resources are available in view of the fact that at least one mobile entity stops using the corresponding first bearer. This corresponds to step S40 discussed in connection with FIG. 3.

The method above takes advantage of the multipath capabilities for improving the network usage of radio resources. The radio resources of the mobile network can be reduced based on the instructions from the server outside the network. Furthermore, operators are informed that multipath capabilities in other networks (public or private WiFi) or WiFi guest networks are available. This information can be used to optimize radio resources such as releasing resources or migrating users to non-cellular access networks or guaranteeing calls over another user traffic.

The invention claimed is:

1. A method for operating an application server providing a service to a multipath enabled mobile entity connected to the application server with a first bearer of a first access network of a first mobile communications network, wherein the application server is external to the mobile communications network, the method comprising:
   the application server receiving an indication generated and sent by an application running on the mobile entity, wherein the indication indicates that the mobile entity has an option to use another bearer not belonging to the first mobile communications network for accessing the application server that is configured to provide the service via the application; and
   the application server transmitting a request message towards a policy control entity of the first mobile communications network requesting the policy control entity to disconnect the first bearer, wherein the indication indicates:
   (i) that the application is using a communication network that is different from the mobile communications network; or
   (ii) that a connection is established without enrichment of a public land mobile network (PLMN) identifier (ID) or a different PLMN ID.

2. The method according to claim 1, wherein
   the request message is transmitted from the application server to an entity configured to expose capabilities of interfaces provided by the first mobile communications network, and
   the request message is transmitted from the entity configured to expose the capabilities of the interfaces provided by the first mobile communications network to the policy control entity.

3. The method according to claim 1, wherein receiving an indication comprises receiving information from the mobile entity, which indicates that the mobile entity can access the service provided by the application server using said another bearer in a non-cellular access network.

4. The method according to claim 1, wherein the request message comprises a quality of service (QoS) parameter indicating to disconnect the first bearer.

5. An application server configured to provide a service to a multipath enabled mobile entity connected to the application server with a first bearer of a first access network of a first mobile communications network, wherein the application server is external to the mobile communications network, the application server comprising a memory and at least one processing unit, the memory containing instructions executable by said at least one processing unit, wherein the application server is operative to:
   receive an indication generated and sent by an application running on the mobile entity, wherein the indication indicates that the mobile entity has an option to use another bearer not belonging to the first mobile communications network for accessing the application server that is configured to provide the service via the application; and
   transmit a request message towards a policy control entity of the first mobile communications network requesting the policy control entity to disconnect the first bearer wherein the indication indicates:
   (i) that the application is using a communication network that is different from the mobile communications network; or
   (ii) that a connection is established without enrichment of a public land mobile network (PLMN) identifier (ID) or a different PLMN ID.

6. The application server according to claim 5, wherein
   the request message is transmitted from the application server to an entity configured to expose capabilities of interfaces provided by the first mobile communications network, and
   the request message is transmitted from the entity configured to expose the capabilities of the interfaces provided by the first mobile communications network to the policy control entity.

7. The application server according to claim 5, further being configured, for receiving the indication, to receive the information from the mobile entity, which indicates that the mobile entity can access the service provided by the application server using the other bearer in a non-cellular access network.

8. A computer program product comprising a non-transitory computer readable medium storing a computer program comprising program code which, when executed by at least one processing unit of an application server, causes the at least one processing unit to execute a method according to claim 1.

9. The method according to claim 1, wherein the indication indicates:
 (i) that the application is using a communication network that is different from the mobile communications network;
 (ii) that a connection is established without enrichment of a public land mobile network (PLMN) identifier (ID) or a different PLMN ID; or
 (iii) that the application has access to a communication network that is different from the mobile communications network.

10. The method according to claim 1, wherein the request message is transmitted to the policy control entity without going through the mobile entity.

11. The application server according to claim 5, wherein the request message is transmitted to the policy control entity without going through the mobile entity.

\* \* \* \* \*